US012593303B2

(12) United States Patent
Wu et al.

(10) Patent No.: US 12,593,303 B2
(45) Date of Patent: Mar. 31, 2026

(54) POSITIONING SYSTEM AND METHOD

(71) Applicant: BYD COMPANY LIMITED, Shenzhen (CN)

(72) Inventors: Hongwen Wu, Shenzhen (CN); Longping Jiang, Shenzhen (CN); Chengxiong Huang, Shenzhen (CN); Kaikuo Zhuo, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 310 days.

(21) Appl. No.: 18/526,234

(22) Filed: Dec. 1, 2023

(65) Prior Publication Data

US 2024/0098681 A1 Mar. 21, 2024

Related U.S. Application Data

(63) Continuation of application No. PCT/CN2022/108010, filed on Jul. 26, 2022.

(30) Foreign Application Priority Data

Jul. 30, 2021 (CN) .......................... 202110874709.4

(51) Int. Cl.
*H04W 64/00* (2009.01)

(52) U.S. Cl.
CPC .................................... *H04W 64/00* (2013.01)

(58) Field of Classification Search
CPC .......... H04W 64/00; G01S 5/02; G01S 5/021; G01S 5/06; G01S 5/0226
See application file for complete search history.

(56) References Cited

U.S. PATENT DOCUMENTS 8,493,992 B2 * 7/2013 Sella .................... H04L 67/1051
370/252
8,547,870 B2 * 10/2013 Curticapean .......... G01S 5/0258
370/252

(Continued)

FOREIGN PATENT DOCUMENTS

CN 111830463 A 10/2020
CN 112235710 A 1/2021

(Continued)

OTHER PUBLICATIONS

International Search Report and Written Opinion for Application No. PCT/CN222/108010, mailed on Oct. 10, 2022, 9 pages.

*Primary Examiner* — Hai V Nguyen
(74) *Attorney, Agent, or Firm* — Sheppard Mullin Richter & Hampton LLP

(57) ABSTRACT

A positioning system includes a target device and multiple base stations connected with the target device. The multiple base stations include a master base station and multiple slave base stations that include a first slave base station and a second slave base station and are serially connected based on a synchronization order. The master base station is connected with the first slave base station. The master base station transmits a first positioning information to the target device and transmits a synchronization message to the multiple slave base stations based on the synchronization order. Each of the slave base stations transmits a second positioning information to the target device. The target device obtains location information of the target device based on an inter-station delay, a base station location, a first time receiving the first positioning information, and a second time receiving the second positioning information.

14 Claims, 3 Drawing Sheets

(56) References Cited

U.S. PATENT DOCUMENTS

| | | | | |
|---|---|---|---|---|
| 8,687,560 | B2* | 4/2014 | Sugar | G01S 5/021 |
| | | | | 455/456.2 |
| 9,088,906 | B2* | 7/2015 | Sella | H04L 67/1051 |
| 10,367,677 | B2* | 7/2019 | Parkvall | H04W 52/0251 |
| 11,493,589 | B2* | 11/2022 | Cheng | H04W 64/00 |
| 11,856,542 | B2* | 12/2023 | Huang | G01S 13/878 |
| 12,170,972 | B2* | 12/2024 | Kolding | H04W 56/0015 |
| 12,231,284 | B2* | 2/2025 | Parkvall | H04J 11/0059 |
| 12,355,695 | B2* | 7/2025 | Siomina | H04L 5/0051 |
| 12,363,706 | B2* | 7/2025 | Takeda | H04W 48/16 |
| 2006/0221980 | A1* | 10/2006 | Bose | H04L 49/254 |
| | | | | 370/431 |
| 2007/0105548 | A1* | 5/2007 | Mohan | H04W 88/021 |
| | | | | 455/462 |
| 2010/0199257 | A1* | 8/2010 | Biggerstaff | G06F 8/456 |
| | | | | 717/110 |
| 2011/0184581 | A1* | 7/2011 | Storch | G06Q 10/06 |
| | | | | 700/295 |
| 2011/0188391 | A1* | 8/2011 | Sella | H04W 74/085 |
| | | | | 370/252 |
| 2012/0328061 | A1* | 12/2012 | Chow | H04W 4/20 |
| | | | | 375/354 |
| 2013/0127980 | A1* | 5/2013 | Haddick | G06F 3/013 |
| | | | | 348/14.08 |
| 2013/0286973 | A1* | 10/2013 | Selia | H04L 67/1051 |
| | | | | 370/329 |
| 2014/0045522 | A1* | 2/2014 | Sugar | H04W 64/00 |
| | | | | 455/456.1 |
| 2015/0119079 | A1* | 4/2015 | Tarlazzi | H04W 24/00 |
| | | | | 455/456.1 |
| 2020/0374824 | A1* | 11/2020 | Chen | H04W 56/0015 |
| 2021/0250825 | A1* | 8/2021 | Purkayastha | H04W 36/06 |
| 2022/0091222 | A1* | 3/2022 | Cheng | H04W 4/80 |
| 2022/0124763 | A1* | 4/2022 | Takeda | H04W 48/16 |
| 2022/0140975 | A1* | 5/2022 | Siomina | H04L 27/26025 |
| | | | | 370/329 |
| 2022/0330181 | A1* | 10/2022 | Kolding | H04W 56/0015 |
| 2023/0043248 | A1* | 2/2023 | Huang | H04W 56/002 |
| 2024/0215054 | A1* | 6/2024 | Haustein | H04W 4/20 |
| 2024/0427302 | A1* | 12/2024 | Haustein | G05B 15/02 |
| 2025/0113281 | A1* | 4/2025 | Palka | H04W 36/0069 |
| 2025/0133598 | A1* | 4/2025 | Matsumura | H04W 48/16 |
| 2025/0298116 | A1* | 9/2025 | Scheers | G01S 5/021 |

FOREIGN PATENT DOCUMENTS

| | | | | |
|---|---|---|---|---|
| CN | 112312326 A | 2/2021 | | |
| CN | 112423225 A | 2/2021 | | |
| EP | 3243085 B1* | 5/2021 | | G01S 5/14 |
| EP | 4286881 A1* | 12/2023 | | G01S 5/06 |
| WO | WO-2012170046 A1* | 12/2012 | | G01S 5/0258 |
| WO | WO-2023232981 A1* | 12/2023 | | G01S 5/06 |
| WO | WO-2024153362 A1* | 7/2024 | | H04W 64/00 |

* cited by examiner

POSITIONING SYSTEM AND METHOD

CROSS-REFERENCE TO RELATED APPLICATIONS

This application is a Continuation Application of International Patent Application No. PCT/CN2022/108010, filed on Jul. 26, 2022, which is based on and claims priority to and benefits of Chinese Patent Application No. 202110874709.4, filed on Jul. 30, 2021. The entire content of all of the above-referenced applications is incorporated herein by reference.

FIELD

The present disclosure relates to the technical field of positioning, and more particularly, to a positioning system and method.

BACKGROUND

In the related art, a Ultra-Wideband (UWB) positioning system may be composed of multiple base stations and multiple target devices. To achieve centimeter-level high positioning precision, in the UWB positioning system, time synchronization is generally required between the multiple base stations, and the time synchronization requires to be completed through a clock synchronization server, which has high system complexity and high cost.

SUMMARY

The present disclosure provides a positioning system and method, to solve problems existing in the related art.

In order to achieve the above objectives, a first aspect of the present disclosure provides a positioning system. The system incudes a target device and multiple stations. The multiple base stations include a master base station and multiple slave base stations. The multiple slave base stations at least include a first slave base station and a second slave base station. The target device is connected with the master base station and the multiple slave base stations. The master base station is connected with the first slave base station. The multiple slave base stations are serially connected based on a synchronization order in which the slave base stations successively receive a synchronization message.

The master base station is configured to transmit first positioning information to the target device, and transmit a synchronization message to the first slave base station.

The first slave base station is configured to receive the synchronization message transmitted by the master base station, transmit second positioning information to the target device based on the synchronization message, and forward the synchronization message to the second slave base station.

The second slave base station is configured to receive the synchronization message forwarded by the first slave base station, and transmit the second positioning information to the target device based on the synchronization message.

The target device is configured to: obtain a first time when the first positioning information is received, and a second time when one of the second positioning information is received; and to obtain target location information of the target device based on an inter-station delay, base station location information, the first time, and the second time; where the inter-station delay represents a time difference between two base stations of the base stations transmitting pieces of positioning information to the target device, and the base station location information includes base station location information of each of the base stations.

In an embodiment, the second slave base station is further configured to determine, based on the synchronization order, whether a third slave base station located after the second slave base station exists, and in response to determining that the third slave base station exists, the second slave base station forwards the first synchronization message to the third slave base station, and the third slave base station transmits the second positioning information to the target device based on the first synchronization message.

In an embodiment, each of the first positioning information, the second positioning information, and the first synchronization message includes a positioning information identifier.

The master base station is configured to periodically transmit the first positioning information to the target device, and transmit the first synchronization message to the first slave base station. A positioning information identifier of the synchronization message and a positioning information identifier of the first positioning information transmitted in a same period are the same, and a positioning information identifier of the synchronization message and a positioning information identifier of the first positioning information transmitted in different periods are different.

The first slave base station is configured to obtain a first positioning information identifier based on the first synchronization message transmitted by the master base station, transmit the second positioning information to the target device based on the first positioning information identifier, and forward the first synchronization message to the second slave base station.

The second slave base station is configured to obtain a second positioning information identifier based on the first synchronization message forwarded by the first slave base station, and transmit the second positioning information to the target device based on the second positioning information identifier.

The target device is configured to obtain the target location information of the target device based on the inter-station delay, the base station location information, the first time, and the second time in response to that the first positioning information identifier of the first positioning information is the same as the second positioning information identifier of the second positioning information.

In an embodiment, the system further includes a server. The server is connected with the base stations.

The target device is further configured to broadcast the target location information to each of the base stations within a first reporting time.

Each of the base stations is configured to receive the target location information within a second reporting time corresponding to each of the base stations, and forward the target location information to the server, the second reporting time including the first reporting time.

The server is configured to receive the target location information forwarded by each of the base stations, and record a correspondence between the target device and the target location information of each of the base stations.

In an embodiment, the target location information includes information identifiers, and the information identifiers respectively corresponding to the target location information obtained by the target device in different periods are different.

In an embodiment, multiple target devices are arranged. The multiple target devices respectively correspond to different device identifiers.

Each of the target devices is configured to determine a first reporting time based on a device identifier corresponding to each of the target devices. Different device identifiers correspond to different first reporting times.

In an embodiment, the master base station is configured to: detect operating states and communication states of the multiple slave base stations, in response to that a first operating state or a first communication state of a target slave base station is abnormal, remove the target slave base station from the synchronization order to obtain a new synchronization order, transmit the new synchronization order to each of remaining slave base stations. Each of the remaining slave base stations is configured to forward the synchronization message based on the new synchronization order.

In an embodiment, the target device is connected to the multiple base stations through a first network, and the multiple base stations are connected through a second network.

According to a second aspect, the present disclosure provides a positioning method using a positioning system of the first aspect. The positioning system includes a target device and multiple stations. The multiple base stations include a master base station and multiple slave base stations. The multiple slave base stations at least include a first slave base station and a second slave base station. The target device is connected with the master base station and the multiple slave base stations. The master base station is connected with the first slave base station. The multiple slave base stations are serially connected based on a synchronization order in which the slave base stations successively receive a synchronization message.

The method includes the following steps.

The master base station transmits first positioning information to the target device, and transmits a synchronization message to the first slave base station.

The first slave base station receives the synchronization message transmitted by the master base station, transmitting second positioning information to the target device based on the synchronization message, and forwards the synchronization message to the second slave base station.

The second slave base station receives the synchronization message forwarded by the first slave base station, and transmits the second positioning information to the target device based on the synchronization message.

The target device obtains a first time when the first positioning information is received, and a second time when one of the second positioning information is received.

The target device obtains target location information of the target device based on an inter-station delay, a base station location, the first time, and the second time, where the inter-station delay represents a time difference between any two base stations of the multiple base stations transmitting positioning information to the target device, and the base station location includes location information of each of the base stations.

In an embodiment, each of the first positioning information, the second positioning information, and the first synchronization message includes a positioning information identifier.

That the master base station transmits first positioning information to the target device, and transmits a synchronization message to the first slave base station includes the following steps.

The master base station is configured to periodically transmit the first positioning information to the target device, and transmit the first synchronization message to the first slave base station. A positioning information identifier of the synchronization message and a positioning information identifier of the first positioning information transmitted in a same period are the same, and a positioning information identifier of the synchronization message and a positioning information identifier of the first positioning information transmitted in different periods are different.

That the first slave base station receives the synchronization message transmitted by the master base station, transmits second positioning information to the target device based on the synchronization message, and forwards the synchronization message to the second slave base station includes the following steps.

The first slave base station obtains a first positioning information identifier based on the first synchronization message transmitted by the master base station, transmits the second positioning information to the target device based on the first positioning information identifier, and forwards the first synchronization message to the second slave base station.

That the second slave base station receives the synchronization message forwarded by the first slave base station, and transmits the second positioning information to the target device based on the synchronization message includes the following steps.

The second slave base station obtains a second positioning information identifier based on the first synchronization message forwarded by the first slave base station, and transmits the second positioning information to the target device based on the second positioning information identifier.

That the target device obtains location information of the target device based on a inter-station delay, a base station location, the first time, and the second time includes the following steps.

The target device obtains the target location information of the target device based on the inter-station delay, the base station location information, the first time, and the second time in response to that the first positioning information identifier of the first positioning information is the same as the second positioning information identifier of the second positioning information.

In an embodiment, the positioning system further includes a server, and the server is connected with the base stations.

The method further includes the following steps.

The target device broadcasts the target location information to each of the base stations within a first reporting time.

Each of the base stations is configured to receive the target location information within a second reporting time corresponding to each of the base stations, and forward the target location information to the server, the second reporting time including the first reporting time.

The server receives the target location information forwarded by each of the base stations, and records a correspondence between the target device and the target location information of each of the base stations.

According to the above technical solution, the present disclosure provides a positioning system and method. In this way, the time synchronization of the multiple base stations is not required by the clock synchronization server, and the location information of the target device can be obtained by the synchronization order, the inter-station delay, and the synchronization message, thereby reducing complexity of the positioning system and saving costs of the positioning system.

Other features and advantages of the present disclosure are to be described in detail in the following detailed description part.

BRIEF DESCRIPTION OF THE DRAWINGS

The accompanying drawings provide further understanding of the present disclosure and constitute a part of this specification. The accompanying drawings and the implementations below are used together for explaining the present disclosure rather than constituting a limitation to the present disclosure. In the accompanying drawings.

DETAILED DESCRIPTION

Figure 1:
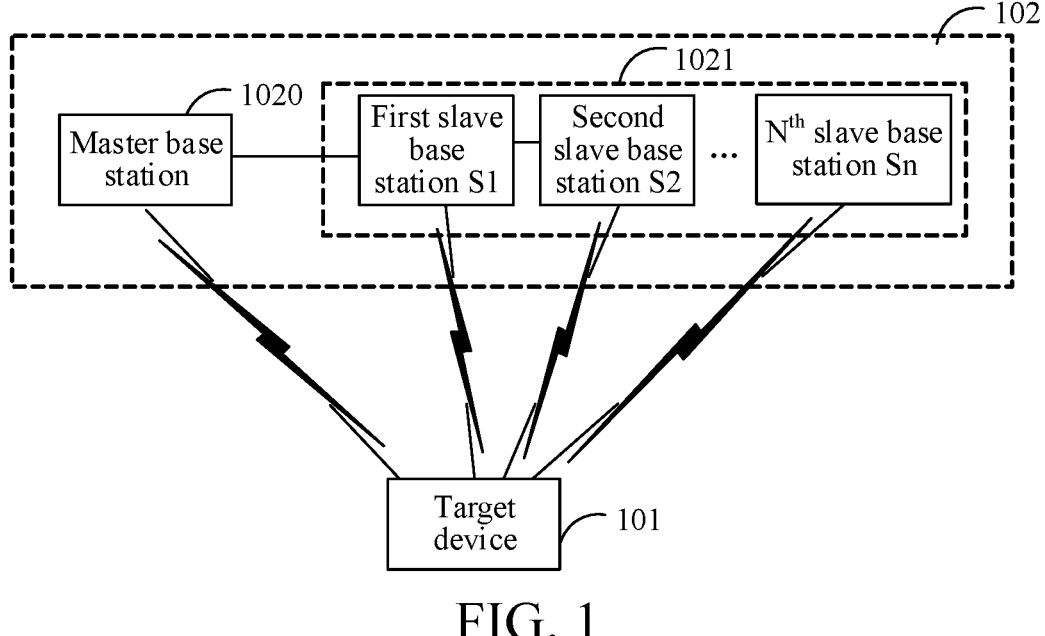
FIG. 1 is a schematic structural diagram of a positioning system according to an embodiment of the present disclosure.

Some implementations of the present disclosure are described in detail below with reference to the accompanying drawings. It should be understood that the implementations described herein are merely used to describe and explain the present disclosure, but are not to limit the present disclosure.

It should be noted that terms such as "first" and "second" are merely used for distinguishing descriptions, and cannot be understood as an indication or implication of relative importance, or an indication or implication of an order. Terms "S101", "S102", "S201", "S202", and the like are used for distinguishing steps without necessarily being construed as performing steps of a method in a order or sequence. When the following description involves the accompanying drawings, unless otherwise indicated, the same numerals in different accompanying drawings represent the same or similar elements.

First, an application scenario of the present disclosure is described. The present disclosure may be applied to a positioning scenario, and more particularly, to a UWB positioning system. The UWB positioning system may be composed of a target device and multiple base stations. To achieve centimeter-level positioning precision, the UWB positioning system may use a time difference of arrival (TDOA) for precise positioning. The TDOA positioning is a method of positioning by using a time difference. For example, the target device periodically transmits a BLINK beacon signal. After the multiple base stations receive the BLINK beacon signal, each base station converts a time of receiving the BLINK beacon signal into a unified reference time and transmits the time to a host computer. The host computer subtracts the time when the multiple base stations receive the BLINK beacon signal in pairs to obtain multiple time differences. A hyperbola corresponding to each time difference can be obtained based on location information and the time difference of the base station, and a point where the multiple hyperbolas intersect may be configured as a location of the target device.

In order to accurately calculate the time difference between the BLINK beacon signals received by the two base stations and calculate a reference time, each base station needs to report the time when the base station receives the BLINK beacon signal to the host computer with a unified time reference. In this way, a unified clock synchronization server connected to each base station is required to realize time synchronization between multiple base stations. As a result, costs of the positioning system are high.

In order to resolve the foregoing problem, the present disclosure provides a positioning system and method. The positioning system includes a target device and multiple base stations. The multiple base stations include a master base station and multiple slave base stations. The multiple slave base stations at least include a first slave base station and a second slave base station. The target device is connected with the master base station and the multiple slave base stations. The master base station is connected with the first slave base station. The multiple slave base stations are serially connected based on a synchronization order. In some embodiments, the synchronization order may be preset to represent a preset order in which the slave base stations successively receive a synchronization message. The first slave base station is a slave base station that receives the synchronization message from the master base station based on the synchronization order. The second slave base station receives the synchronization message from the first slave base station based on the synchronization order. The master base station is configured to transmit a first positioning information to the target device, and transmit a synchronization message to the first slave base station. The synchronization message is serially forwarded among the multiple slave base stations based on the synchronization order. The slave base station that receives the synchronization message is configured to transmit a second positioning information to the target device. The target device is configured to obtain a first time when the first positioning information is received, and a second time when one of the second positioning information is received; and obtain location information of the target device (e.g., target location information) based on a preset inter-station delay, a base station location, the first time, and the second time. In this way, the time synchronization of the multiple base stations is not required by the clock synchronization server, and the location information of the target device can be obtained by the synchronization order, the preset inter-station delay, and the synchronization message, thereby reducing complexity of the positioning system and saving costs of the positioning system.

Some implementations of the present disclosure are described in detail below with reference to the accompanying drawings.

FIG. 1 is a schematic structural diagram of a positioning system according to an embodiment of the present disclosure. As shown in FIG. 1, the positioning system includes a target device 101 and multiple base stations 102. The multiple base stations 102 include a master base station 1020 and multiple slave base stations 1021. The multiple slave base stations 1021 at least include a first slave base station S1 and a second slave base station S2. The target device is connected with the master base station and the multiple slave base stations. The master base station is connected with the first slave base station. The multiple slave base stations are serially connected based on a synchronization order. In some embodiments, the synchronization order may be preset to represent a preset order in which the slave base stations successively receive a synchronization message. The first slave base station is a slave base station that receives the synchronization message from the master base station based on the synchronization order. The second slave base station is a slave base station that receives the synchronization message from the first slave base station based on the synchronization order.

The master base station is configured to transmit first positioning information to the target device, and transmit a synchronization message to the first slave base station.

The first slave base station is configured to receive the synchronization message transmitted by the master base station, transmit second positioning information to the target device based on the synchronization message, and forward the synchronization message to the second slave base station.

The second slave base station is configured to receive the synchronization message forwarded by the first slave base station, and transmit the second positioning information to the target device based on the synchronization message.

The target device is configured to obtain a first time when the first positioning information (e.g., from the master base station) is received, and a second time when the second positioning information (e.g., from the slave base stations) is received; and obtain location information of the target device based on a preset inter-station delay, a base station location, the first time, and the second time. The preset inter-station delay represents a time difference between any two base stations of the multiple base stations transmitting positioning information to the target device. The time difference includes a physical transmission delay and a hardware processing delay between the two base stations. For example, the physical transmission delay includes time of transmitting the synchronization message, and the hardware processing delay includes time for the slave base station to receive and process the synchronization message and transmit the second positioning information. The base station location may be preset to include location information for each of the base stations.

It should be noted that the target device may receive multiple second positioning information, so the above second time may be multiple.

For example, the positioning system may be the UWB positioning system. The target device may be a positioning tag in the UWB positioning system. Both the first positioning information and the second positioning information may be BLINK UWB pulse signals. The synchronization message may be a Capture/Compare/PWM (CCP) pulse.

Further, the second slave base station is further configured to determine, based on the synchronization order, whether a third slave base station located after the second slave base station exists, and forward the synchronization message to the third slave base station in a case that the third slave base station exists, so that the third slave base station transmits the second positioning information to the target device based on the synchronization message.

The multiple slave base stations of the positioning system include a first slave base station S1, a second slave base station S2, and a third slave base station S3 by way of example for description below.

The synchronization order may be S1→S2→S3, that is, S1 is the first slave base station that receives the synchronization message transmitted by the master base station. In this way, the master base station may transmit the first positioning information to the target device in a case that receiving a positioning start signal is received; and simultaneously transmit the synchronization message to the first slave base station S1.

After the first slave base station S1 receives the synchronization message, the second positioning information may be transmitted to the target device, and the synchronization message may be simultaneously transmitted to the second slave base station S2 based on the synchronization order. Similarly, after the second slave base station S2 receives the synchronization message, the second positioning information may be transmitted to the target device, and the synchronization message may be simultaneously transmitted to the third slave base station S3. After the third slave base station S3 receives the synchronization message, it is determined that the third slave base station is a last stage in the synchronization order, and the second positioning information may be transmitted to the target device.

It should be noted that contents of the second positioning information transmitted by the first slave base station S1, the second slave base station S2, and the third slave base station S3 may be the same, and may also include the respective base station identifiers.

In a case that more slave base stations are arranged/configured, the synchronization messages may be successively transmitted to the slave base stations in the entire network based on the synchronization order. Each slave base station can may transmit the second positioning information to the target device and transmit the synchronization message to a next slave base station to which the slave base station is connected.

According to the positioning system, the system includes a target device and multiple base stations. The multiple base stations include a master base station and multiple slave base stations. The multiple slave base stations at least include a first slave base station and a second slave base station. The target device is connected with the master base station and the multiple slave base stations. The master base station is connected with the first slave base station. The multiple slave base stations are serially connected based on a synchronization order. The synchronization order is configured to represent a preset order in which the slave base stations successively receive a synchronization message. The first slave base station is a slave base station that receives the synchronization message from the master base station based on the synchronization order. The second slave base station is a slave base station that receives the synchronization message from the first slave base station based on the synchronization order. The master base station is configured to transmit a synchronization message to the first slave base station while the first positioning information is transmitted to the target device. The first slave base station is configured to receive the synchronization message transmitted by the master base station, transmit second positioning information to the target device based on the synchronization message, and forward the synchronization message to the second slave base station. The second slave base station is configured to receive the synchronization message forwarded by the first slave base station, and transmit the second positioning information to the target device based on the synchronization message. The target device is configured to obtain a first time when the first positioning information is received, and a second time when the second positioning information is received; and obtain location information of the target device based on a preset inter-station delay, a base station location, the first time, and the second time. The preset inter-station delay represents a time difference between any two base stations of the multiple base stations transmitting positioning information to the target device, and the base station location includes preset location information of each of the base stations. In this way, the time synchronization of the multiple base stations is not required by the clock synchronization server, and the location information of the target device can be obtained by the synchronization order, the preset inter-station delay, and the synchronization message, thereby reducing complexity of the positioning system and saving costs of the positioning system.

Further, the target device may be connected to the multiple base stations through a first network, and the multiple base stations are connected with each other through a second network.

For example, the first network may be a UWB network, and the second network may be a wired network or a wireless network, such as 2G, 3G, 4G, 5G, and Wi-Fi.

In this way, the master base station may transmit the first positioning information to the target device through the first network. The slave base station may transmit the second positioning information to the target device through the first network. The synchronization messages may be transmitted or received through the second network between the master base station and the slave base station, and among the multiple slave base stations without occupying resources of the first network for positioning, which may improve positioning efficiency and reliability.

In another embodiment of the present disclosure, the master base station may be respectively connected to multiple slave base stations, and the multiple slave base stations may be connected in pairs. For example, all base stations may be interconnected in pairs through the wired network.

The master base station may be configured to: detect operating states and communication states of the multiple slave base stations, remove a target slave base station from the synchronization order if the operating state or the communication state of the target slave base station is abnormal, obtain a new synchronization order, and transmit the new synchronization order to each of the remaining slave base stations (e.g., the slave base stations included in the new synchronization order). Each slave base station may perform the steps of forwarding the synchronization message based on the new synchronization order.

In this way, even if a slave base station fails, it is possible to ensure that other base stations can still communicate normally, thereby improving reliability of the positioning system.

In another embodiment of the present disclosure, the first positioning information, the second positioning information, and the synchronization message each may include a positioning information identifier. The positioning information identifier is configured to distinguish transmitting periods of the positioning information and the synchronization messages. In other words, the positioning information identifiers of the first positioning information transmitted in different periods within the preset time period are different. The synchronization message transmitted in each period and the positioning information identifier in the second positioning information are the same as the positioning information identifier in the first positioning information transmitted in the period.

For example, the positioning information identifier may start from 0, be increased by 1 for each transmission period, and be increased from 0 again until it is increased to N. In this way, different positioning periods may be distinguished by the positioning information identifier, and mixing of positioning information of different periods may be avoided to cause positioning to obtain wrong location information.

The master base station is configured to periodically transmit first positioning information to the target device, and transmit a synchronization message to the first slave base station. The first positioning information may include positioning information identifier and master base station identifier. The synchronization message may further include a positioning information identifier. The synchronization message transmitted in different periods within the preset time period and the positioning information identifier of the first positioning information are different, and the positioning information identifier in the synchronization message transmitted in each period is the same as the positioning information identifier in the first positioning information transmitted in the period.

The first slave base station is configured to obtain the positioning information identifier (e.g., first positioning information identifier) based on the synchronization message transmitted by the master base station, transmit the second positioning information to the target device based on the positioning information identifier, and forward the synchronization message to the second slave base station. The second positioning information may further include positioning information identifier and slave base station identifier.

The second slave base station is configured to obtain the positioning information identifier (e.g., second positioning information identifier) based on the synchronization message forwarded by the first slave base station, and transmit the second positioning information to the target device based on the positioning information identifier.

The target device is configured to obtain a first time when the first positioning information is received, and a second time when the second positioning information is received; and obtain location information of the target device based on the preset inter-station delay, the base station location, the first time, and the second time in a case that the positioning information identifier of the received first positioning information is the same as the positioning information identifier of the second positioning information.

The preset inter-station delay and the base station location may be preset in the target device.

The base station location includes preset location information for each of the base stations.

The preset inter-station delay represents a time difference between any two base stations of the multiple base stations transmitting positioning information to the target device. Since the second positioning information is transmitted by the slave base station in a case that the synchronization message is received, the time difference includes the physical transmission delay and hardware processing delay between the two base stations. The physical transmission delay includes a delay of transmitting the synchronization message. The hardware processing delay includes a delay for the slave base station to receive and process the synchronization message and transmit the second positioning information. The preset inter-station delay may be obtained or calibrated experimentally.

For example, the target device may calculate the arrival time difference between the master base station P and the first slave base station S1 by the following formula:

$$TDOA1 = FT2 - FT1 - GAPTIME1.$$

TDOA1 represents an arrival time difference between the master base station P and the first slave base station S1. FT1 represents a first time when the target device receives the first positioning information transmitted by the master base station. FT2 represents a second time when the target device receives the first second positioning information transmitted from the first slave base station. GAPTIME1 represents a preset inter-station delay between the master base station P and the first slave base station S1.

Similarly, the target device may calculate the arrival time difference between the second slave base station S2 and the third slave base station S3 by the following formula:

$$TDOA2 = FT4 - FT3 - GAPTIME2.$$

TDOA2 represents an arrival time difference between the second slave base station S2 and the third slave base station S3. FT4 represents a time when the target device receives the third second positioning information transmitted from the base station. FT3 represents a time when the target device receives the second positioning information transmitted from the second slave base station. GAPTIME2 represents a preset inter-station delay between the second slave base station S2 and the third slave base station S3.

Compared with multiple time interactions and filtering methods in wireless synchronization, the arrival time difference can be obtained by this method, which only needs to subtract the above preset inter-station delay. The algorithm is relatively simple and efficient.

In this way, the arrival time difference between any two base stations can be calculated. Based on multiple arrival time differences, the position calculation is performed by the TDOA wireless positioning algorithm, and the location information of the target device can be obtained.

Figure 2:
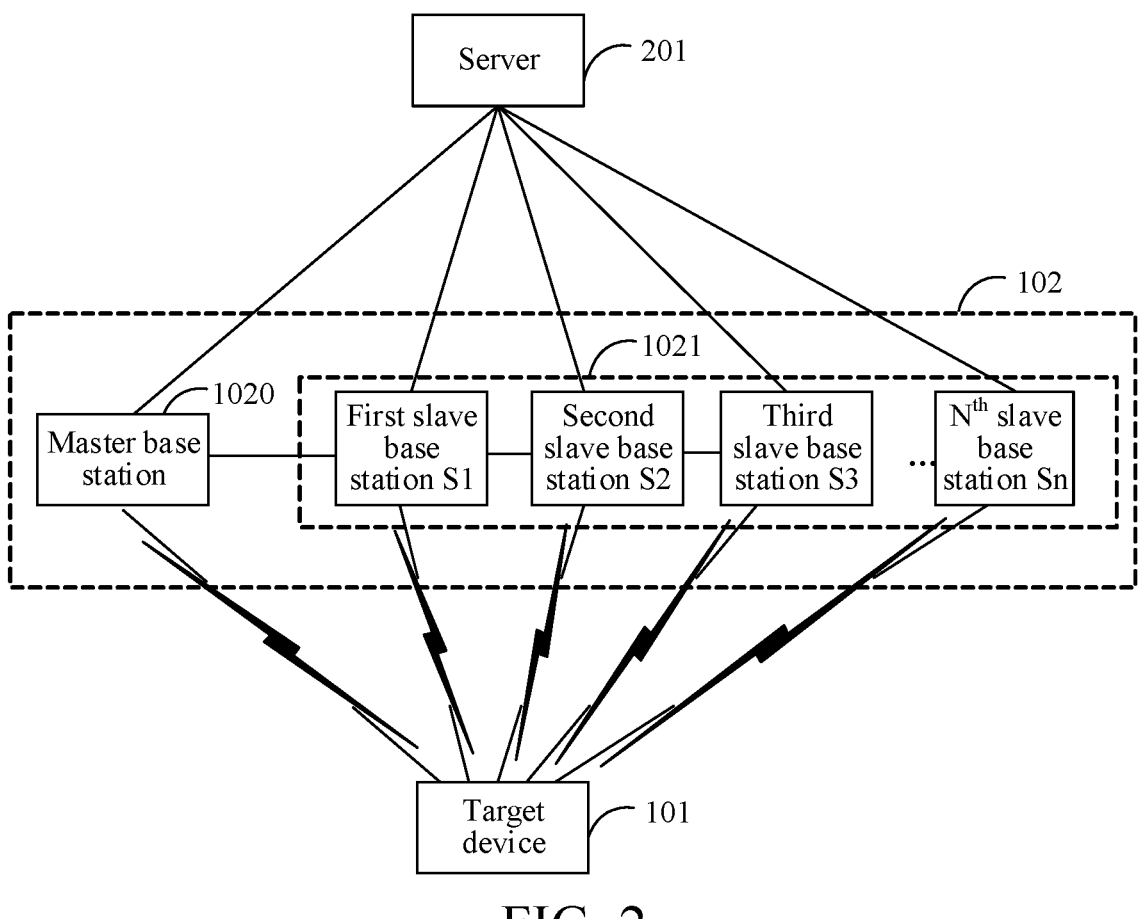
FIG. 2 is a schematic structural diagram of another positioning system according to an embodiment of the present disclosure.

FIG. 2 is a schematic structural diagram of another positioning system according to an embodiment of the present disclosure. As shown in FIG. 2, the positioning system further includes a server 201. The server is connected to the base station.

The target device is further configured to broadcast the location information (e.g., target location information) to the base station within a first preset reporting time in a case that the location information is obtained.

The base station is configured to receive the location information within a second preset reporting time corresponding to the base station, and forward the location information to the server, the second preset reporting time including the first preset reporting time.

The server is configured to receive the location information forwarded by the base station, and save a correspondence between the target device and the location information.

For example, the master base station may start a first timer and a second timer after the first positioning information is transmitted.

The first timer is used by the master base station to periodically transmit the first positioning information. In other words, after the first timer expires, the master base station increments the positioning information identifier by 1, and then transmits the new first positioning information according to the new positioning information identifier.

The second timer is configured to receive the location information transmitted by the target device, for example, after the second timer expires, the master base station receives the location information broadcast by the target device within the second preset reporting time.

A sum of a duration of the second timer and the second preset reporting time may be less than a duration of the first timer.

Similarly, the slave base station may start the second timer after the second positioning information is transmitted. After the second timer expires, the slave base station also receives the location information broadcast by the target device within the second preset reporting time.

After the target device receives the first positioning information (which may be the first positioning information or the second positioning information), a third timer and a fourth timer may be started.

The third timer is configured to determine whether the positioning is successful. If the location information of the target device cannot be obtained based on the location information even after the third timer expires, it is determined that the positioning fails. The location calculation is stopped and the new positioning information is waited for receiving.

The fourth timer is configured to report the location information. For example, in a case that the fourth timer expires and the location information is obtained, the target device broadcasts the location information within the first preset reporting time.

A sum of the fourth timer and the first preset reporting time may be less than the third timer. The third timer may be less than or equal to the first timer.

In this way, the target device may report the location information to the server through the base station.

Further, the location information includes information identifier. The information identifiers corresponding to the location information obtained by the target device in different periods are different.

In this way, in a case that the location information broadcast and transmitted by the target device can be received and transmitted to the server by the multiple base stations, the server receives multiple information identifiers transmitted by the same target device with the same location information, and can retain only one piece of location information based on the information identifier, to effectively remove duplicate information and reduce occupation of storage resources.

The first preset reporting time may be the preset reporting time after the target device receives the first positioning information or the second positioning information. In addition, the first preset reporting time may also be determined based on a quantity of target devices in the positioning system and target identification identifier.

For example, multiple target devices may be arranged. The multiple target devices correspond to different device identifiers. The target device is further configured to determine the first preset reporting time based on the device identifier of each target device. Different device identifiers respectively correspond to different first preset reporting times.

For example, the positioning system has a maximum of N target devices, and the corresponding device identifiers are 1 to N, respectively. A large second preset reporting time may be set first, and the second preset reporting time may be divided into N equal parts, each of which is a first preset reporting time. Subsequently, based on a time order and a magnitude order of the device identifier, each time is allocated to the target device as the first preset reporting time corresponding to the target device.

In this way, the multiple target devices can be avoided from simultaneously reporting the location information, a problem of location information reporting caused by a resource conflict may be avoided, and reliability of the location information reporting may be improved.

Figure 3:
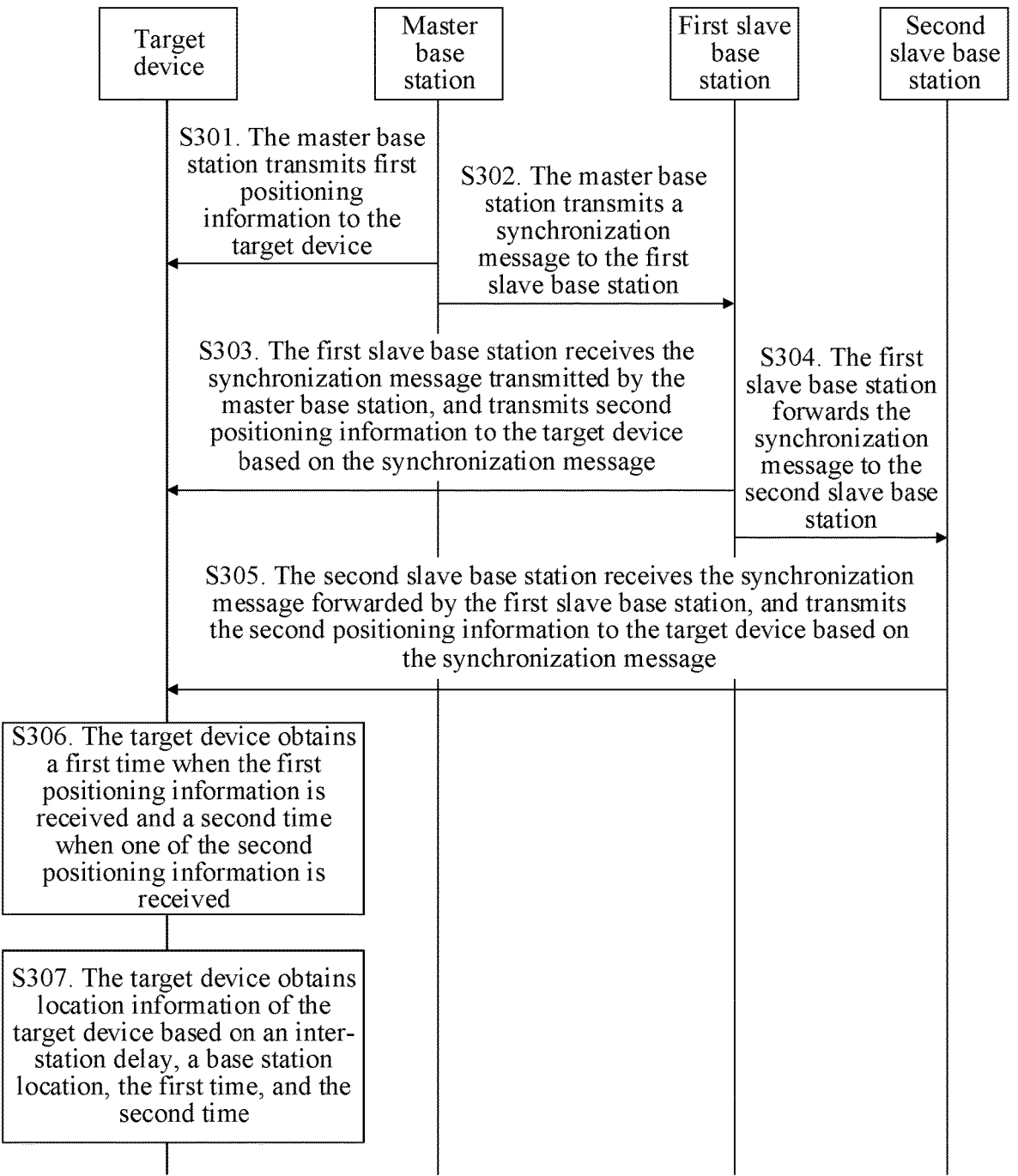
FIG. 3 is a flowchart of a positioning method according to an embodiment of the present disclosure.

FIG. 3 is a flowchart of a positioning method according to an embodiment of the present disclosure. As shown in FIG. 3, an execution body of the method may be the positioning system. The positioning system includes a target device and multiple base stations. The multiple base stations include a master base station and multiple slave base stations. The multiple slave base stations at least include a first slave base station and a second slave base station. The target device is connected with the master base station and the multiple slave base stations. The master base station is connected with the first slave base station. The multiple slave base stations are serially connected based on a synchronization order. In some embodiments, the synchronization order may be preset to represent a preset order in which the slave base stations successively receive a synchronization message. The first slave base station is a slave base station that receives the synchronization message from the master base station based on the synchronization order. The second slave base station is a slave base station that receives the synchronization message from the first slave base station based on the synchronization order. The method includes the following steps.

S301: A master base station transmits first positioning information to the target device.

For example, the master base station may transmit the first positioning information to the target device in a case that receiving a positioning start signal is received. For example, the positioning start signal may be a user control signal received by the master base station, or may be a server background running start signal received by the master base station. The server may be a positioning server connected to the multiple base stations.

S302: The master base station transmits a synchronization message to the first slave base station.

S303: The first slave base station receives the synchronization message transmitted by the master base station, and transmits second positioning information to the target device based on the synchronization message.

S304: The first slave base station forwards the synchronization message to the second slave base station.

The second slave base station is a slave base station located after the first slave base station in the synchronization order.

It should be noted that S301 steps and S302 steps may be performed simultaneously, and S303 steps and S304 steps may also be performed simultaneously.

S305: The second slave base station receives the synchronization message forwarded by the first slave base station, and transmits the second positioning information to the target device based on the synchronization message.

Further, the second slave base station may further be configured to determine, based on the synchronization order, whether a third slave base station located after the second slave base station exists, and forward the synchronization message to the third slave base station in a case that the third slave base station exists.

S306: The target device obtains a first time when the first positioning information is received, and a second time when the second positioning information is received.

S307: The target device obtains location information of the target device based on a preset inter-station delay, a base station location, the first time, and the second time.

The preset inter-station delay represents a time difference between any two base stations of the multiple base stations transmitting positioning information to the target device, and the base station location includes preset location information of each of the base stations.

By using the above method, the master base station is configured to transmit a synchronization message to the first slave base station based on the synchronization order of multiple slave base stations while the first positioning information is transmitted to the target device. In response to receiving the synchronization message, the slave base station transmits the second positioning information to the target device, and forwards the synchronization message to a next slave base station of the slave base station based on the synchronization order. The target device is configured to obtain a first time when the first positioning information is received, and a second time when the second positioning information is received; and obtain location information of the target device based on a preset inter-station delay, a base station location, the first time, and the second time. The preset inter-station delay represents a time difference between any two base stations of the multiple base stations transmitting positioning information to the target device, and the base station location includes preset location information of each of the base stations. In this way, the time synchronization of the multiple base stations is not required by the clock synchronization server, and the location information of the target device can be obtained by the synchronization order, the preset inter-station delay, and the synchronization message, thereby reducing complexity of the positioning system and saving costs of the positioning system.

Further, the target device may be connected to the multiple base stations through a first network, and the multiple base stations are connected through a second network.

For example, the first network may be a UWB network, and the second network may be a wired network or a wireless network, such as 2G, 3G, 4G, 5G, and Wi-Fi.

In this way, the master base station may transmit the first positioning information to the target device through the first network. The slave base station may transmit the second positioning information to the target device through the first network. The synchronization messages may be transmitted or received through the second network between the master base station and the slave base station, and among the multiple slave base stations without occupying resources of the first network for positioning, which may improve positioning efficiency and reliability.

In another embodiment of the present disclosure, the master base station may be respectively connected to multiple slave base stations, and the multiple slave base stations may be connected in pairs. For example, all base stations may be interconnected in pairs through the wired network.

The master base station may be configured to: detect operating states and communication states of the multiple slave base stations, remove a target slave base station from the synchronization order if the operating state or the communication state of the target slave base station is abnormal, obtain a new synchronization order, and transmit the new synchronization order to each of the remaining slave base stations. Each remaining slave base station may perform the steps of forwarding the synchronization message based on the new synchronization order.

In this way, even if a slave base station fails, it is possible to ensure that other base stations can still communicate normally, thereby improving reliability of the positioning system.

In another embodiment of the present disclosure, the first positioning information, the second positioning information, and the synchronization message each include a positioning information identifier. The positioning information identifier is configured to distinguish transmitting periods of the positioning information and the synchronization messages. In other words, the positioning information identifiers of the first positioning information transmitted in different periods within the preset time period are different. The synchronization message transmitted in each period and the positioning information identifier in the second positioning information are the same as the positioning information identifier in the first positioning information transmitted in the period. In this way, the master base station may be configured to periodically transmit first positioning information to the target device, and transmit a synchronization message to the first slave base station. The first positioning information may include positioning information identifier and master base station identifier. The synchronization message may further include a positioning information identifier. The positioning information identifiers of the first positioning information transmitted in different periods within the preset time period are different. The positioning information identifier in the synchronization message transmitted in each period is the same as the positioning information identifier in the first positioning information transmitted in the period.

The first slave base station may be configured to obtain the positioning information identifier based on the synchronization message transmitted by the master base station, transmit the second positioning information to the target device based on the positioning information identifier, and forward the synchronization message to the second slave base station. The second positioning information may further include positioning information identifier and slave base station identifier.

The second slave base station may be configured to obtain the positioning information identifier based on the synchronization message forwarded by the first slave base station, and transmit the second positioning information to the target device based on the positioning information identifier.

The target device is configured to obtain a first time when the first positioning information is received, and a second time when the second positioning information is received.

That the target device obtains location information of the target device based on a preset inter-station delay, a base station location, the first time, and the second time includes the following step.

The target device obtains location information of the target device based on the preset inter-station delay, the base station location, the first time, and the second time in a case that the positioning information identifier of the received first positioning information is the same as the positioning information identifier of the second positioning information.

The preset inter-station delay and the base station location may be preset in the target device.

The base station location includes preset location information for each of the base stations.

The preset inter-station delay represents a time difference between any two base stations of the multiple base stations transmitting positioning information to the target device. Since the second positioning information is transmitted by the slave base station in a case that the synchronization message is received, the time difference includes the physical transmission delay and hardware processing delay between the two base stations. The physical transmission delay includes a delay of transmitting the synchronization message. The hardware processing delay includes a delay for the slave base station to receive and process the synchronization message and transmit the second positioning information. The preset inter-station delay may be obtained or calibrated experimentally.

In another embodiment of the present disclosure, the positioning system further includes a server. The server is connected with the base station. The method further includes the following steps.

Firstly, the target device broadcasts the location information to the base station within a first preset reporting time in a case that the location information is obtained.

Secondly, the multiple base stations receive the location information within a second preset reporting time corresponding to the base station, and forward the location information to the server.

The second preset reporting time includes the first preset reporting time.

Finally, the server receives the location information forwarded by the base station and saves a correspondence between the target device and the location information.

In this way, the target device may report the location information to the server through the base station.

Further, the location information includes information identifier. The information identifiers corresponding to the location information obtained by the target device in different periods are different.

In this way, in a case that the location information broadcast and transmitted by the target device can be received and transmitted to the server by the multiple base stations, the server receives multiple information identifiers transmitted by the same target device with the same location information, and can retain only one piece of location information based on the information identifier, to effectively remove duplicate information and reduce occupation of storage resources.

The first preset reporting time may be the preset reporting time after the target device receives the first positioning information or the second positioning information. In addition, the first preset reporting time may also be determined based on a quantity of target devices in the positioning system and target identification identifier.

For example, multiple target devices may be arranged. The multiple target devices correspond to different device identifiers. In this way, the first preset reporting time corresponding to the target device can be determined based on the device identifier of each target device, and different device identifiers correspond to different first preset reporting times.

For example, the positioning system has a maximum of N target devices, and the corresponding device identifiers are 1 to N, respectively. A large second preset reporting time may be set first, and the second preset reporting time may be divided into N equal parts, each of which is a first preset reporting time. Subsequently, based on a time order and a magnitude order of the device identifier, each time is allocated to the target device as the first preset reporting time corresponding to the target device.

In this way, the multiple target devices can be avoided from simultaneously reporting the location information, a problem of location information reporting caused by a resource conflict may be avoided, and reliability of the location information reporting may be improved.

The implementations of the present disclosure are described in detail above with reference to the accompanying drawings. However, the present disclosure is not limited to the details in the foregoing implementations, multiple simple deformations may be made to the technical solution of the present disclosure within a range of the technical concept of the present disclosure, and these simple deformations fall within the protection scope of the present disclosure.

It should be additionally noted that the technical features described in the foregoing implementations may be combined in any proper manner in a case without conflict. To avoid unnecessary repetition, various possible combination manners are not described in the present disclosure.

In addition, different implementations of the present disclosure may also be arbitrarily combined without departing from the idea of the present disclosure, and these combinations shall still be regarded as content disclosed in the present disclosure.

What is claimed is:

1. A positioning system, comprising a target device and a plurality of base stations, the base stations comprising a master base station and a plurality of slave base stations, the slave base stations at least comprising a first slave base station and a second slave base station, the target device being connected with the master base station and the slave base stations, the master base station being connected with the first slave base station, the slave base stations being serially connected based on a synchronization order, in which the slave base stations successively receive a synchronization message, wherein:

the master base station is configured to transmit first positioning information to the target device, and to transmit a first synchronization message to the first slave base station;

the first slave base station is configured to receive the first synchronization message transmitted by the master base station, to transmit second positioning information to the target device based on the first synchronization message, and to forward the first synchronization message to the second slave base station;

the second slave base station is configured to receive the first synchronization message forwarded by the first slave base station, and to transmit the second positioning information to the target device based on the first synchronization message; and the target device is configured to obtain a first time when the first positioning information is received, and a second time when one of the second positioning information is received; and to obtain target location information of the target device based on an inter-station delay, base station location information, the first time, and the second time; wherein the inter-station delay represents a time difference between two base stations of the base stations transmitting pieces of positioning information to the target device, and the base station location information includes base station location information of each of the base stations.

2. The system according to claim 1, wherein:

the second slave base station is further configured to determine, based on the synchronization order, whether a third slave base station located after the second slave base station exists, and in response to determining that the third slave base station exists, the second slave base station forwards the first synchronization message to the third slave base station, and the third slave base station transmits the second positioning information to the target device based on the first synchronization message.

3. The system according to claim 1, wherein each of the first positioning information, the second positioning information, and the first synchronization message comprises a positioning information identifier;

the master base station is configured to periodically transmit the first positioning information to the target device, and transmit the first synchronization message to the first slave base station, wherein a positioning information identifier of the synchronization message and a positioning information identifier of the first positioning information transmitted in a same period are the same; and a positioning information identifier of the synchronization message and a positioning information identifier of the first positioning information transmitted in different periods are different;

the first slave base station is configured to obtain a first positioning information identifier based on the first synchronization message transmitted by the master base station, transmit the second positioning information to the target device based on the first positioning information identifier, and forward the first synchronization message to the second slave base station;

the second slave base station is configured to obtain a second positioning information identifier based on the first synchronization message forwarded by the first slave base station, and transmit the second positioning information to the target device based on the second positioning information identifier; and the target device is configured to obtain the target location information of the target device based on the inter-station delay, the base station location information, the first time, and the second time in response to that the first positioning information identifier of the first positioning information is the same as the second positioning information identifier of the second positioning information.

4. The system according to claim 3, further comprising a server, the server being connected with each of the base stations, wherein:

the target device is further configured to broadcast the target location information to each of the base stations within a first reporting time;

each of the base stations is configured to receive the target location information within a second reporting time corresponding to each of the base stations, and forward the target location information to the server, the second reporting time comprising the first reporting time; and the server is configured to receive the target location information forwarded by each of the base stations, and record a correspondence between the target device and the target location information of each of the base stations.

5. The system according to claim 1, wherein the target location information comprises information identifiers; and the information identifiers respectively corresponding to the target location information obtained by the target device in different periods are different.

6. The system according to claim 1, further comprising a plurality of target devices including the target device, wherein:

the target devices respectively correspond to different device identifiers, each of the target devices is configured to determine a first reporting time based on a device identifier corresponding to each of the target devices; and the different device identifiers correspond to different first reporting times.

7. The system according to claim 1, wherein the master base station is configured to:

detect operating states and communication states of the slave base stations, in response to that a first operating state or a first communication state of a target slave base station is abnormal, remove the target slave base station from the synchronization order to obtain a new synchronization order, transmit the new synchronization order to each of remaining slave base stations, and each of the remaining slave base stations is configured to forward the synchronization message based on the new synchronization order.

8. A positioning method, applicable to a positioning system, the positioning system comprising a target device and a plurality of base stations, the base stations comprising a master base station and a plurality of slave base stations, the slave base stations at least comprising a first slave base station and a second slave base station, the target device being connected with the master base station and the slave base stations, the master base station being connected with the first slave base station, the slave base stations being serially connected based on a synchronization order in which the slave base stations successively receive a synchronization message; and the method comprising:

transmitting, by the master base station, first positioning information to the target device, and transmitting a first synchronization message to the first slave base station;

receiving, by the first slave base station, the first synchronization message transmitted by the master base station, transmitting second positioning information to the target device based on the first synchronization message, and forwarding the first synchronization message to the second slave base station;

receiving, by the second slave base station, the first synchronization message forwarded by the first slave base station, and transmitting the second positioning information to the target device based on the first synchronization message;

obtaining, by the target device, a first time when the first positioning information is received, and a second time when one of the second positioning information is received; and obtaining, by the target device, target location information of the target device based on an inter-station delay, base station location information, the first time, and the second time, wherein the inter-station delay represents a time difference between two base stations of the base stations transmitting pieces of positioning information to the target device, and the base station location information comprises base station location information of each of the base stations.

9. The method according to claim 8, wherein each of the first positioning information, the second positioning information, and the first synchronization message comprises a positioning information identifier;

the transmitting, by the master base station, the first positioning information to the target device, and transmitting the first synchronization message to the first slave base station comprises:

periodically transmitting, by the master base station, the first positioning information to the target device, and transmitting the first synchronization message to the first slave base station, wherein a positioning information identifier of the synchronization message and a positioning information identifier of the first positioning information transmitted in a same period are the same; and a positioning information identifier of the synchronization message and a positioning information identifier of the first positioning information transmitted in different periods are different;

the receiving, by the first slave base station, the first synchronization message transmitted by the master base station, transmitting the second positioning information to the target device based on the first synchronization message, and forwarding the first synchronization message to the second slave base station comprises:

obtaining, by the first slave base station, a first positioning information identifier based on the first synchronization message transmitted by the master base station, transmitting the second positioning information to the target device based on the first positioning information identifier, and forwarding the first synchronization message to the second slave base station;

the receiving, by the second slave base station, the first synchronization message forwarded by the first slave base station, and transmitting the second positioning information to the target device based on the first synchronization message comprises:

obtaining, by the second slave base station, a second positioning information identifier based on the first synchronization message forwarded by the first slave base station, and transmitting the second positioning information to the target device based on the second positioning information identifier; and the obtaining, by the target device, the target location information of the target device based on the inter-station delay, the base station location information, the first time, and the second time comprises:

obtaining, by the target device, the target location information of the target device based on the inter-station delay, the base station location information, the first time, and the second time in response to that the first positioning information identifier of the first positioning information is the same as the second positioning information identifier of the second positioning information.

10. The method according to claim 9, wherein the positioning system further comprises a server; the server is connected with each of the base stations; and the method further comprises:

broadcasting, by the target device, the target location information to each of the base stations within a first reporting time;

receiving, by each of the base stations, the target location information within a second reporting time corresponding to each of the base stations, and forwarding the target location information to the server, the second reporting time comprising the first reporting time; and receiving, by the server, the target location information forwarded by each of the base stations, and recording a correspondence between the target device and the target location information of each of the base stations.

11. The method according to claim 9, wherein the target location information comprises information identifiers; and the information identifiers respectively corresponding to the target location information obtained by the target device in different periods are different.

12. The method according to claim 9, wherein the system further comprises a plurality of target devices including the target device, wherein:

the target devices respectively correspond to different device identifiers, each of the target devices is configured to determine a first reporting time based on a device identifier corresponding to each of the target devices; and the different device identifiers correspond to different first reporting times.

13. The method according to claim 9, further comprising:

detecting, by the master base station, operating states and communication states of the slave base stations, in response to that a first operating state or a first communication state of a target slave base station is abnormal, removing, by the master base station, the target slave base station from the synchronization order to obtain a new synchronization order, transmit the new synchronization order to each of remaining slave base stations, and each of the remaining slave base stations is configured to forward the synchronization message based on the new synchronization order.

14. The method according to claim 9, wherein:

the second slave base station is further configured to determine, based on the synchronization order, whether a third slave base station located after the second slave base station exists, and in response to determining that the third slave base station exists, the second slave base station forwards the first synchronization message to the third slave base station, and the third slave base station transmits the second positioning information to the target device based on the first synchronization message.

* * * * *